Patented Oct. 3, 1933

1,929,381

UNITED STATES PATENT OFFICE 1,929,381

PURIFICATION OF SUCCINIC ACID AND SUCCINIC ANHYDRIDE

Alphons O. Jaeger and Franz P. Fiedler, Mount Lebanon, Pa., assignors to Selden Company, Pittsburgh, Pa., a corporation of Delaware No Drawing. Application March 23, 1932
Serial No. 600,818

19 Claims. (Cl. 260—122)

This invention relates to the purification of crude or semi-purified succinic acid and anhydride and particularly crude products obtained from the reduction of crude maleic or fumaric acids.

Maleic and fumaric acids, which may be obtained by the catalytic oxidation of organic compounds such as benzene, toluene, furfural, phenols, wood tar, phthalic anhydride, etc. or as by-products from the catalytic oxidation of naphthalene or phenanthrene to phthalic anhydride and anthracene to anthraquinone are frequently obtained in a crude state, especially when they are obtained as by-products from the leaching of low grade phthalic anhydride, and they normally possess a reddish-brown color and contain large amounts of impurities. When such crude maleic or fumaric acid is subjected to reduction, either electrolytic or by means of zinc or other methods, crude succinic acid is obtained which is reddish-brown in color and contains tarry materials. This product is very difficult to purify by any recrystallization methods as the colored impurities adhere very strongly.

It has been considered in the past and is reported in the literature that succinic acid cannot be distilled or sublimed without extensive decomposition. According to the present invention the surprising discovery has been made that when vaporized at a temperature not too greatly above the melting point of the succinic acid, particularly when vaporizing with an inert gas such as nitrogen, carbon dioxide, hydrogen, or especially steam, succinic acid or in the case of gases other than steam, a mixture of succinic acid and succinic anhydride can be readily obtained with only insignificant losses through decomposition, and a product of excellent purity is obtained.

Where large amounts of colored impurities are present, the product of a straight sublimation, with or without a fractional condensation from the gas stream, results in a product which is of a high chemical purity but is still somewhat colored as some of the colored impurities are somewhat volatile, and of course even traces of colored impurities too small to be detectable by ordinary chemical analysis are sufficient to impart considerable color to the product. In such cases the use of catalytic adsorbents between the sublimer and the condenser result in the production of pure white material. The adsorbent can be regenerated by burning out the impurities, heating with superheated steam, or any other manner. The catalytic adsorbent which has proven to be most effective practically is the aluminum oxide gel obtainable in the trade under the name of "alumina gel", but any of the other catalytic adsorbents described in the application of A. O. Jaeger, Serial No. 337,534, filed February 4, 1929 which is now Patent No. 1,852,782, issued April 5, 1932 may be used and are included. It is understood, of course, that the use of catalytic adsorbents in the purification of organic sublimable materials generally is not claimed in the present application, but, on the contrary, the use of a catalytic adsorbent for removing colored impurities is claimed only in combination with the sublimation of succinic acid which forms the primary subject matter of the present application.

Steam, particularly superheated steam, has many advantages as a carrier vapor. It has high heat capacity and minimizes decomposition of succinic acid to the point where it is substantially absent. Steam is also a cheap carrier vapor and is therefore preferred, although the invention is in no sense limited to the use of steam, and where slightly lower yields are unobjectionable air presents some economic advantages. When subliming with steam it is desirable to condense out the succinic acid at temperatures above 100° C. so that it is obtained in a dry form, or, if desired, of course, the steam may be condensed as well, resulting in a water solution of succinic acid from which the latter can be recovered by concentration and crystallization, if desired.

The invention will be described in greater detail in connection with the following specific examples:

Example 1

50 parts of crude succinic acid, obtained by the electrolytic reduction of crude maleic acid liquor from the fume towers of plants for the catalytic oxidation of naphthalene to phthalic anhydride, are heated in a sublimer to a temperature of 185–195° C. The molten mass is reddish-brown in color and contains considerable quantities of tarry impurities. A slow stream of air or carbon dioxide is passed through the sublimer, the temperature of which is preferably maintained constant, and the air which has become charged with succinic acid vapors is passed through "alumina gel" and is then condensed in fractional condensers maintained at the following temperatures:—first condenser at 120–140° C.; second condenser at 80–100° C.; and, third condenser at 30–40° C. 46 parts of pure white succinic acid containing some anhydride are obtained, the yield being 98% or better of the succinic acid content of the crude material.

Where air is used there is some danger of explosions especially if the sublimation is carried out to a fairly complete exhaustion of the molten crude succinic acid charged into the sublimer because a coke is formed which is highly pyrophoric. Ignition with consequent explosions may be avoided by incorporating with the crude succinic acid to be sublimed a sufficient amount of finely divided sodium chloride or similar compound of an alkali or alkaline earth metal which acts as an anti-combustion catalyst. For example, compounds which are described in my copending application Serial No. 291,143, filed July 7, 1928.

Example 2

Crude or semi-purified succinic acid obtained by the zinc dust reduction of maleic acid leached from low grade phthalic anhydride condensed from the vapors in the cold condensers of a fractional condensation system is heated in a sublimer to a temperature of about 225° C. Water is given off and the anhydride is formed. After formation of the anhydride the temperature is raised to 237–243° C. and air blown over or through the liquid succinic anhydride, the air then being led to a fractional condenser where a beautiful white sublimate of succinic anhydride condenses out. Yields over 90% of the amount of succinic acid originally present are obtained.

Instead of using air, nitrogen, carbon dioxide, hydrogen or gases containing hydrogen, such as water gas, may be used as a carrier. In such cases it is normally desirable to recirculate the carrier gas after the sublimed succinic anhydride is condensed out in the condenser.

Example 3

Crude succinic acid obtained as desired in Example 1 or Example 2 is heated in a sublimer to a temperature of about 220° C., and then superheated steam at approximately the same temperature is blown through. The superheated steam carrying vapors of succinic acid are passed through "alumina gel" if there are sufficient colored impurities to contaminate the final product, and then the succinic acid is condensed, the condensers being maintained at 110–115° C. A pure white succinic acid is obtained and the yield is almost theoretical, there being practically no decomposition.

The invention has been specifically described in conjunction with succinic acid produced from the reduction of impure maleic acid obtained from catalytic oxidation processes. This field is the most important one for the present invention since crude succinic acid can be obtained very cheaply from the extremely crude by-product maleic acid obtainable from the catalytic oxidation of naphthalene to phthalic anhydride and the purification of this succinic acid is particularly difficult by ordinary means. However, the present invention is in no sense limited to the purification of crude succinic acid obtained by this method and is applicable to any crude succinic acid containing impurities which are relatively non-volatile obtained by any means. Even in the cases of succinic acid which are sufficiently pure so that they can be practically purified by recrystallization processes, the present invention permits the use of a cheaper sublimation process, although the saving and advantages practically obtained by the use of the present invention are not as great as in the case of crude succinic acid obtained by the reduction of crude catalytic maleic acids which are of such a nature that they cannot be economically purified by any other means.

What is claimed as new is:

1. A method of purifying impure succinic acid containing impurities which are relatively non-volatile, which comprises vaporizing the acid at a temperature above its melting point and below its boiling point into a carrier gas stream and condensing the product included in the group consisting of succinic acid, succinic anhydride, and mixtures of succinic acid and succinic anhydride from said carrier stream.

2. A method of purifying impure succinic acid containing impurities which are relatively non-volatile, which comprises vaporizing the acid at a temperature above its melting point and below its boiling point into a carrier gas stream and condensing the product included in the group consisting of succinic acid, succinic anhydride, and mixtures of succinic acid and succinic anhydride from said carrier stream in a series of condensers maintained at progressively lower temperatures.

3. A method of purifying impure succinic acid which has been obtained by the reduction of impure maleic acid recovered from vapor phase catalytic oxidation processes, which comprises vaporizing the acid at a temperature above its melting point and below its boiling point into a carrier gas stream and condensing the product included in the group consisting of succinic acid, succinic anhydride, and mixtures of succinic acid and succinic anhydride from said carrier stream.

4. A method of purifying impure succinic acid which has been obtained by the reduction of impure maleic acid recovered from vapor phase catalytic oxidation processes, which comprises vaporizing the acid at a temperature above its melting point and below its boiling point into a carrier gas stream and condensing the product included in the group consisting of succinic acid, succinic anhydride, and mixtures of succinic acid and succinic anhydride from said carrier stream in a series of condensers maintained at progressively lower temperatures.

5. A method according to claim 1, in which the carrier gas is superheated steam and the condensation takes place at a temperature above 100° C.

6. A method according to claim 2, in which the carrier gas is superheated steam and the condensation takes place at a temperature above 100° C.

7. A method according to claim 3, in which the carrier gas is superheated steam and the condensation takes place at a temperature above 100° C.

8. A method according to claim 4, in which the carrier gas is superheated steam and the condensation takes place at a temperature above 100° C.

9. A method of purifying impure succinic acid containing adsorbable colored impurities, which comprises vaporizing the succinic acid at a temperature above its melting point and below its boiling point into a carrier gas stream, passing the vapors through an adsorbent for colored impurities, and condensing the product included in the group consisting of succinic acid, succinic anhydride, and mixtures of succinic acid and succinic anhydride from the carrier gas stream.

10. A method of purifying impure succinic acid which has been obtained by the reduction of impure maleic acid recovered from vapor phase catalytic oxidation processes, which comprises vaporizing the succinic acid at a temperature above its melting point and below its boiling point into a carrier gas stream, passing the vapors through an adsorbent for colored impurities, and condensing the product included in the group consisting of succinic acid, succinic anhydride, and mixtures of succinic acid and succinic anhydride from the carrier gas stream.

11. A method of purifying impure succinic acid containing adsorbable colored impurities, which comprises vaporizing the succinic acid at a temperature above its melting point and below its boiling point into a carrier gas stream, passing the vapors through an adsorbent aluminum oxide gel for colored impurities, and condensing the product included in the group consisting of succinic acid, succinic anhydride, and mixtures of succinic acid and succinic anhydride from the carrier gas stream.

12. A method of purifying impure succinic acid which has been obtained by the reduction of impure maleic acid recovered from vapor phase catalytic oxidation processes, which comprises vaporizing the succinic acid at a temperature above its melting point and below its boiling point into a carrier gas stream, passing the vapors through an adsorbent aluminum oxide gel for colored impurities, and condensing the product included in the group consisting of succinic acid, succinic anhydride, and mixtures of succinic acid and succinic anhydride from the carrier gas stream.

13. A method according to claim 9, in which the carrier gas is superheated steam and the condensation takes place at a temperature above 100° C.

14. A method according to claim 10, in which the carrier gas is superheated steam and the condensation takes place at a temperature above 100° C.

15. A method according to claim 11, in which the carrier gas is superheated steam and the condensation takes place at a temperature above 100° C.

16. A method according to claim 12, in which the carrier gas is superheated steam and the condensation takes place at a temperature above 100° C.

17. A method according to claim 3, in which the maleic acid is obtained from the tail gases of a catalytic phthalic anhydride plant.

18. A method according to claim 10, in which the maleic acid is obtained from the tail gases of a catalytic phthalic anhydride plant.

19. A method according to claim 12, in which the maleic acid is obtained from the tail gases of a catalytic phthalic anhydride plant.

ALPHONS O. JAEGER.
FRANZ P. FIEDLER.